(12) United States Patent
Akiyama (10) Patent No.: US 9,510,407 B2
(45) Date of Patent: Nov. 29, 2016

(54) LED DRIVE CIRCUIT

(71) Applicants: CITIZEN HOLDINGS CO., LTD., Nishitokyo-shi, Tokyo (JP); CITIZEN ELECTRONICS CO., LTD., Fujiyoshida-shi, Yamanashi (JP)

(72) Inventor: Takashi Akiyama, Sayama (JP)

(73) Assignees: CITIZEN HOLDINGS CO., LTD., Tokyo (JP); CITIZEN ELECTRONICS CO. LTD., Yamanashi (JP)

(*) Notice: Subject to any disclaimer, the term of this patent is extended or adjusted under 35 U.S.C. 154(b) by 0 days.

(21) Appl. No.: 14/879,155

(22) Filed: Oct. 9, 2015

(65) Prior Publication Data

US 2016/0113077 A1 Apr. 21, 2016

(30) Foreign Application Priority Data

Oct. 10, 2014 (JP) ................................. 2014-208889

(51) Int. Cl.
H05B 33/08 (2006.01)

(52) U.S. Cl.
CPC ........ *H05B 33/0815* (2013.01); *H05B 33/089* (2013.01); *H05B 33/0845* (2013.01)

(58) Field of Classification Search
None
See application file for complete search history.

(56) References Cited

U.S. PATENT DOCUMENTS

2011/0234115 A1* 9/2011 Shimizu ............. H05B 33/0815
315/287

FOREIGN PATENT DOCUMENTS

JP 2014516452 7/2014
WO 2012100183 7/2012

\* cited by examiner

*Primary Examiner* — Dedei K Hammond
(74) *Attorney, Agent, or Firm* — RatnerPrestia (57) ABSTRACT

An LED drive circuit includes a rectification circuit configured to rectify an alternating-current voltage that is input via a dimmer circuit, a delay circuit having a switch, and a light emitting unit including an LED array including LEDs connected in series, wherein the delay circuit turns on the switch when a predetermined time elapses after the alternating-current current is input, and the rectification circuit and the LED array are directly connected when the switch is on.

9 Claims, 5 Drawing Sheets

PRIOR ART

FIG. 5A

PRIOR ART

FIG. 5B

PRIOR ART

LED DRIVE CIRCUIT

FIELD

The present invention relates to an LED drive circuit configured to cause a plurality of LEDs included in an LED array to emit light by applying a pulsating current in a full-wave rectified waveform or the like, which is obtained by rectifying an alternating-current voltage that is supplied from the commercial alternating-current power source, to the LED array in which the plurality of LEDs is connected in series. In more detail, the present invention relates to an LED drive circuit capable of preventing the occurrence of flashing when the LED drive circuit is connected to a dimmer circuit including a TRIAC®.

BACKGROUND

An LED drive circuit configured to cause a plurality of LEDs included in an LED array to emit light by applying a pulsating current in a full-wave rectified waveform or the like, which is obtained by rectifying an alternating-current voltage that is supplied from the commercial alternating-current power source, to the LED array in which the plurality of LEDs is connected in series is known. Further, it is known to cause a partial LED array to blink in accordance with the phase of a pulsating current by arranging a bypass circuit at a connection part that connects the partial LED arrays obtained by dividing an LED array in an LED drive circuit configured to apply a pulsating current to the LED array. Furthermore, it is known to select a partial LED array that is caused to emit light by detecting a current that flows through an LED array and controlling a bypass circuit in accordance with the detected current in an LED drive circuit.

Figure 4:
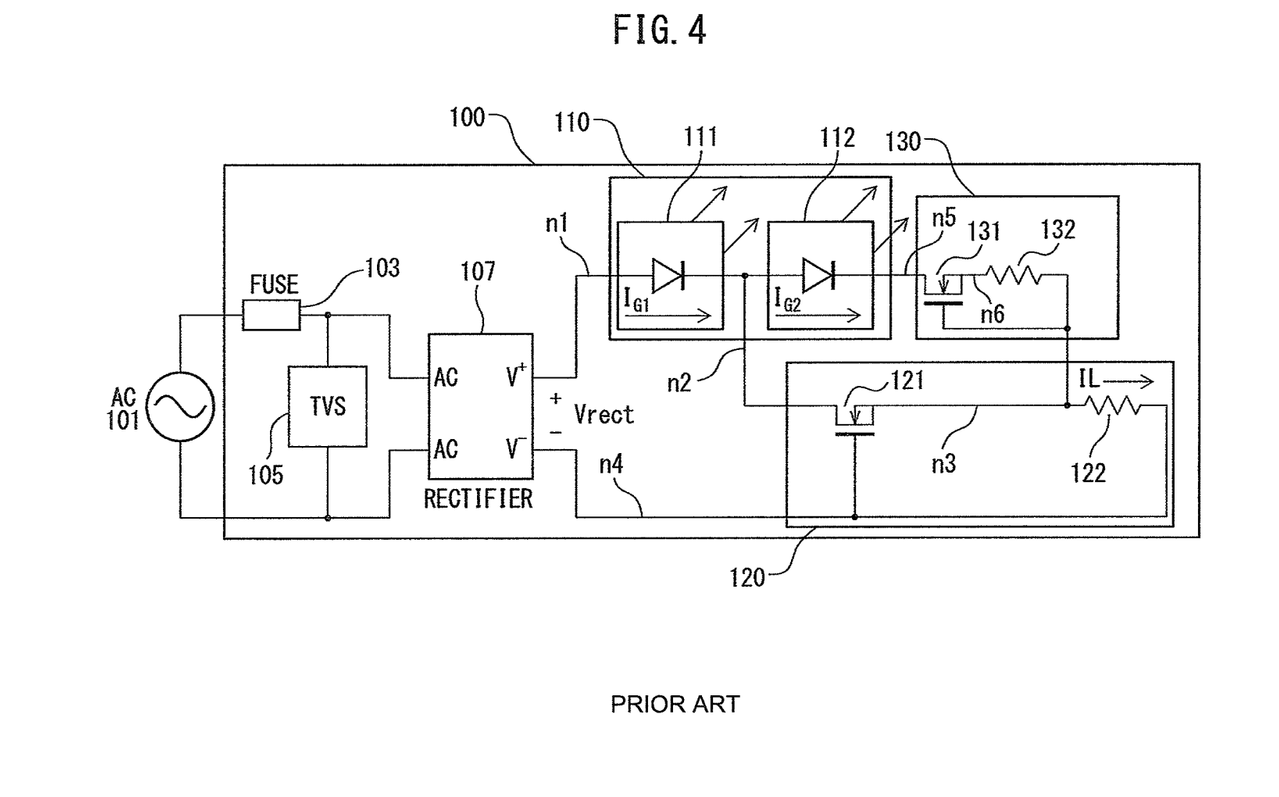
FIG. 4 is a circuit block diagram of a conventional LED drive circuit.

FIG. 4 is a circuit block diagram of an LED drive circuit 100 configured to control a bypass circuit in accordance with a current that flows through an LED array.

The LED drive circuit 100 has a rectification circuit 107 to which an AC voltage is input from a commercial alternating-current power source 101, an LED array 110 including a first partial LED array 111 and a second partial LED array 112, a bypass circuit 120, and a current limiting circuit 130. The bypass circuit 120 includes a bypass FET 121 and a bypass resistor 122. The current limiting circuit 130 includes a current limiting FET 131 and a current limiting resistor 132. The first partial LED array 111 and the second partial LED array 112 are connected in series in such a manner that the first LED array 111 is located in the previous stage of the second partial LED array 122. The bypass FET 121 and the current limiting FET 131 are each a depletion FET. The bypass resistor 122 and the current limiting resistor 132 are each a resistance element that detects a current.

The LED drive circuit 100 further has a fuse 103 that is connected to the commercial alternating-current power source 101, and an overvoltage suppressor (TVS) 105. The rectification circuit 107 has a diode bridge and outputs a full-wave rectified waveform voltage Vrect. A V-terminal (node n4) of the rectification circuit 107 is at the ground level.

Figure 5A:
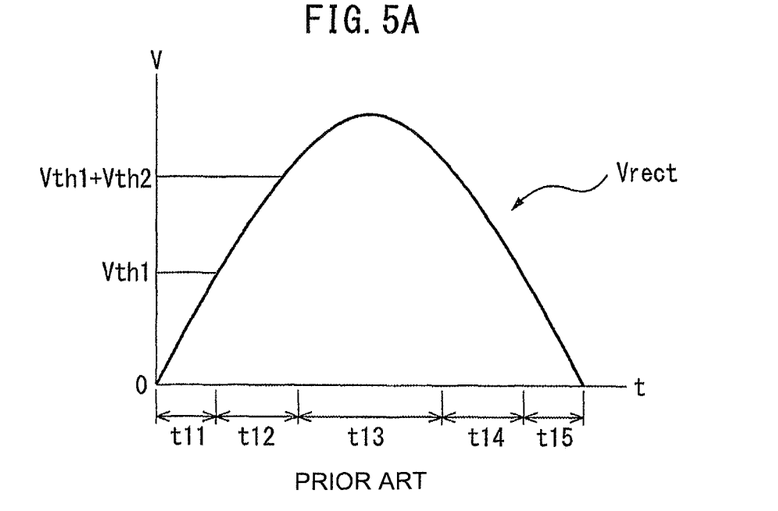
FIG. 5A is a diagram illustrating a waveform voltage explaining the operation of the LED drive circuit illustrated in FIG. 4.
Figure 5B:
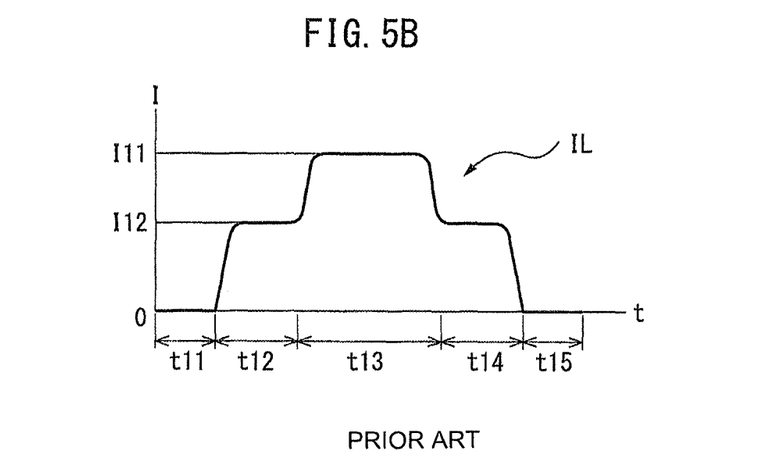
FIG. 5B is a diagram illustrating a waveform current corresponding to FIG. 5A explaining the operation of the LED drive circuit illustrated in FIG. 4

FIGS. 5A and 5B are diagrams each illustrating the operation of the LED drive circuit 100, and FIG. 5A is a diagram illustrating one cycle of the full-wave rectified waveform voltage Vrect and FIG. 5B is a diagram illustrating a light emitting current IL that flows through the bypass resistor 122. In FIG. 5A, the horizontal axis represents a time t, the vertical axis represents a voltage V, and the curve in FIG. 5A represents the full-wave rectified waveform voltage Vrect. In FIG. 5B, the horizontal axis represents the time t, the vertical axis represents a current I, and the curve in FIG. 5B represents the light emitting current IL that flows through the bypass resistor 122. Each of t11 to t15 illustrated along the time axis in FIG. 5A corresponds to each of t11 to t15 illustrated along the time axis in FIG. 5B.

During the period of time t11, the full-wave rectified waveform voltage Vrect is lower than a threshold voltage Vth1 of the first partial LED array 111, and therefore the light emitting current IL does not flow through the LED array 110. The threshold voltage Vth1 of the first partial LED array 111 is the total sum of forward voltage drops of the LEDs connected in series in the first partial LED array 111.

During the period of time t12, the full-wave rectified waveform voltage Vrect increases and the full-wave rectified waveform voltage Vrect becomes higher than the threshold voltage Vth1 of the first partial LED array 111, and therefore a first light emitting current IG1 flows through the first partial LED array 111. However, during the period of time t12, the full-wave rectified waveform voltage Vrect is lower than the total value of the threshold voltage Vth1 of the first partial LED array 111 and a threshold voltage Vth2 of the second partial LED array 112, and therefore a current IG2 does not flow through the second partial LED array 112. The first light emitting current IG1 does not flow via the second partial LED array 112 but flows into the rectification circuit 107 via nodes n1 and n2, the bypass FET 121, and the bypass resistor 122. During the period of time of t12, the voltage drop due to the bypass resistor 122 makes constant a gate-source voltage Vgs of the bypass FET 121, and therefore the bypass FET 121 performs a constant current operation. During the period of time t12, the light emitting current IL that flows through the bypass resistor 122 is equal in magnitude to the current IG1 that flows through the first partial LED array 111. During the last period of time of the period of time t12, the full-wave rectified waveform voltage Vrect is slightly higher than the total value of the threshold voltage Vth1 of the first partial LED array 111 and the threshold voltage Vth2 of the second partial LED array 112. Since the full-wave rectified waveform voltage Vrect is slightly higher than the total value of the threshold voltage Vth1 of the first partial LED array 111 and the threshold voltage Vth2 of the second partial LED array 112, the current IG2 flows through the second partial LED array 112. During the last period of time of the period of time t12, the light emitting current IL that flows through the bypass resistor 122, which has the total value of the current IG1 and the current IG2, is a current I12 and is almost constant, since the amount of decrease in the current IG1 accompanying the increase in Vgs of the bypass FET 121 is almost equal to the amount of increase in the current IG2.

During the period of time t13, due to the increase in the current IG2, the voltage drop due to the bypass resistor 122 becomes large, Vgs of the bypass FET 121 becomes lower than a cutoff voltage, and the bypass FET 121 is cut off. During the period of time t13, the current limiting FET 131 performs the constant current operation, since the voltage drop due to the current limiting resistor 132 makes constant the gate-source voltage Vgs of the current limiting FET 131. During the period of time t13, the light emitting current IL that flows through the bypass resistor 122 is equal to the current IG2 that flows through the second partial LED array 112 and becomes a current I11. The current I11 is the upper limit value of the current that flows through the current limiting circuit 130 including the current limiting FET 131 and the current limiting resistor 132. During the second half of the period of time t13, and the periods of time t14 and t15 during which the full-wave rectified waveform voltage Vrect drops, the light emitting current IL decreases in the opposite manner to that during the periods of time t11 to t13.

In the LED drive circuit 100, the LED array 110 is divided into a plurality of partial LED arrays: the first partial LED array 111 and the second partial LED array 112. The bypass circuit 120 including the bypass FET 121 and the bypass resistor 122 is connected to the node n2 that is the connection part between the first partial LED array 111 and the second partial LED array 112. The bypass FET 121 of the bypass circuit 120 is cut off when the light emitting current IG2 that flows through the second partial LED array 112 becomes large and the gate-source voltage Vgs that is regulated by the voltage of the bypass resistor 122 becomes lower than the cutoff voltage. When the full-wave rectified waveform voltage Vrect, which is a pulsating current, is lower than the total value of the threshold voltage Vth1 of the first partial LED array 111 and the threshold voltage Vth2 of the second partial LED array 112, the LEDs of the first partial LED array 111 emit light, and the LEDs of the second partial LED array 112 do not emit light. When the full-wave rectified waveform voltage Vrect, which is a pulsating current, is equal to or higher than the total value of the threshold voltage Vth1 of the first partial LED array 111 and the threshold voltage Vth2 of the second partial LED array 112, the LEDs included both in the first partial LED array 111 and in the second partial LED array 112 emit light. The LED drive circuit 100 selectively causes the first partial LED array 111 and the second partial LED array 112 to emit light in accordance with the full-wave rectified waveform voltage Vrect.

CITATION LIST

Patent Literature

[Patent Document 1] Japanese National Publication of International Patent Application No. 2014-516452

SUMMARY OF THE INVENTION

A dimmer is known which is also referred to as a dimmer circuit including a TRIAC®. When a dimmer circuit including a TRIAC® was disposed between the commercial alternating-current power source 101 and the fuse 103, a phenomenon also referred to as flashing or flicker occurred, in which the LED drive circuit 100 flashed immediately after the commercial alternating-current power source had turned on and then converged to a predetermined dimmed state.

The present invention has been made in view of the above-described problem and an object thereof is to provide an LED drive circuit in which flashing is unlikely to occur when the power source is turned on, if a dimmer circuit including a TRIAC® is connected between the power source and the LED drive circuit.

The LED drive circuit of the present invention has a rectification circuit configured to rectify an alternating-current voltage that is input via a dimmer circuit, a delay circuit having a switch, and a light emitting unit including an LED array including LEDs that are connected in series, and the delay circuit turns on the switch when a predetermined time elapses after an alternating-current signal is input, and the rectification circuit and the LED array are connected directly while the switch is on.

The LED drive circuit according to the present invention includes the rectification circuit, the delay circuit, and the LED array. The delay circuit forms a current path through which the current that is output from the rectification circuit returns to the rectification circuit via the LED array, and thereby, the LED array is caused to emit light, when a predetermined period of time elapses after the power source turns on and a pulsating current is begun to be output from the rectification circuit.

Further, in the LED drive circuit according to the present invention, it is preferable that the rectification circuit outputs a pulsating current after rectifying the alternating-current voltage that is input via the dimmer circuit, the delay circuit is supplied the pulsating current from the rectification circuit, and further has a capacitor and a capacitor charge circuit configured to supply the pulsating current to the capacitor, the pulsating current is input to the LED array, when the switch is on, and the switch turns on when the terminal-to-terminal voltage of the capacitor becomes a predetermined voltage or higher and forms a current path through which the current that is output from the rectification circuit returns to the rectification circuit via the LED array.

Further, in the LED drive circuit according to the invention, it is preferable for the capacitor charge circuit to include a first resistor that is connected in series to the capacitor.

Further, in the LED drive circuit according to the invention, it is preferable for the delay circuit to further include a second resistor that is connected in parallel to the capacitor.

Further, in the LED drive circuit according to the invention, it is preferable for the delay circuit to further include a zener diode that is connected in parallel to the capacitor.

Further, in the LED drive circuit according to the invention, it is preferable that the switch is an N-type enhancement FET, the gate of the enhancement FET is connected to the terminal on the high potential side of the capacitor, the source of the enhancement FET is connected to the terminal to which the current of the rectification circuit returns, and the drain of the enhancement FET is connected to the terminal from which the current of the LED array is output.

Further, in the LED drive circuit according to the invention, it is preferable to further has a bleeder current circuit that is connected in parallel to the LED array and which forms a current path through which the current that is output from the rectification circuit flows when the voltage between the anode and cathode of the LED array is lower than a bleeder threshold voltage.

Further, in the LED drive circuit according to the invention, it is preferable for the bleeder current circuit to cut off the current path when the voltage between the anode and cathode of the LED array is equal to or higher than the bleeder threshold voltage.

Further, in the LED drive circuit according to the invention, it is preferable for the LED array to have a plurality of partial LED arrays connected in series and a bypass circuit that is connected to a connection point between the plurality of partial LED arrays.

Furthermore, in the LED drive circuit according to the invention, it is preferable for the bypass circuit to be cut off when the current that flows through the partial LED array on the subsequent stage side that is connected to the connection point becomes equal to or larger than a bypass threshold value.

The LED drive circuit according to the present invention has a switch that prevents a current from flowing through the LED array from when the supply of a pulsating current, which is obtained by rectifying an alternating-current voltage supplied via the dimmer circuit, is started until the supplied pulsating current reaches a predetermined amount. In the LED drive circuit according to the present invention, during a period of time corresponding to a period of time during which the state of the dimmer circuit including a TRIAC® is not good immediately after the power source turns on, the switch remains off, and therefore no current flows through the LED array. No current flows through the LED array during the period of time during which the state of the dimmer circuit including a TRIAC® is not good immediately after the power source turns on, and therefore in the LED drive circuit of the present invention, flashing does not occur when the power source turns on even if the LED drive circuit is connected to the dimmer circuit including a TRIAC®.

EMBODIMENTS FOR EMBODYING THE INVENTION

Hereinafter, preferred embodiments of the present invention are explained in detail with reference to FIGS. 1 to 3B. However, it should be noted that the technical scope of the present invention is not limited to those embodiments but encompasses the inventions described in the claims and equivalents thereof.

Figure 1:
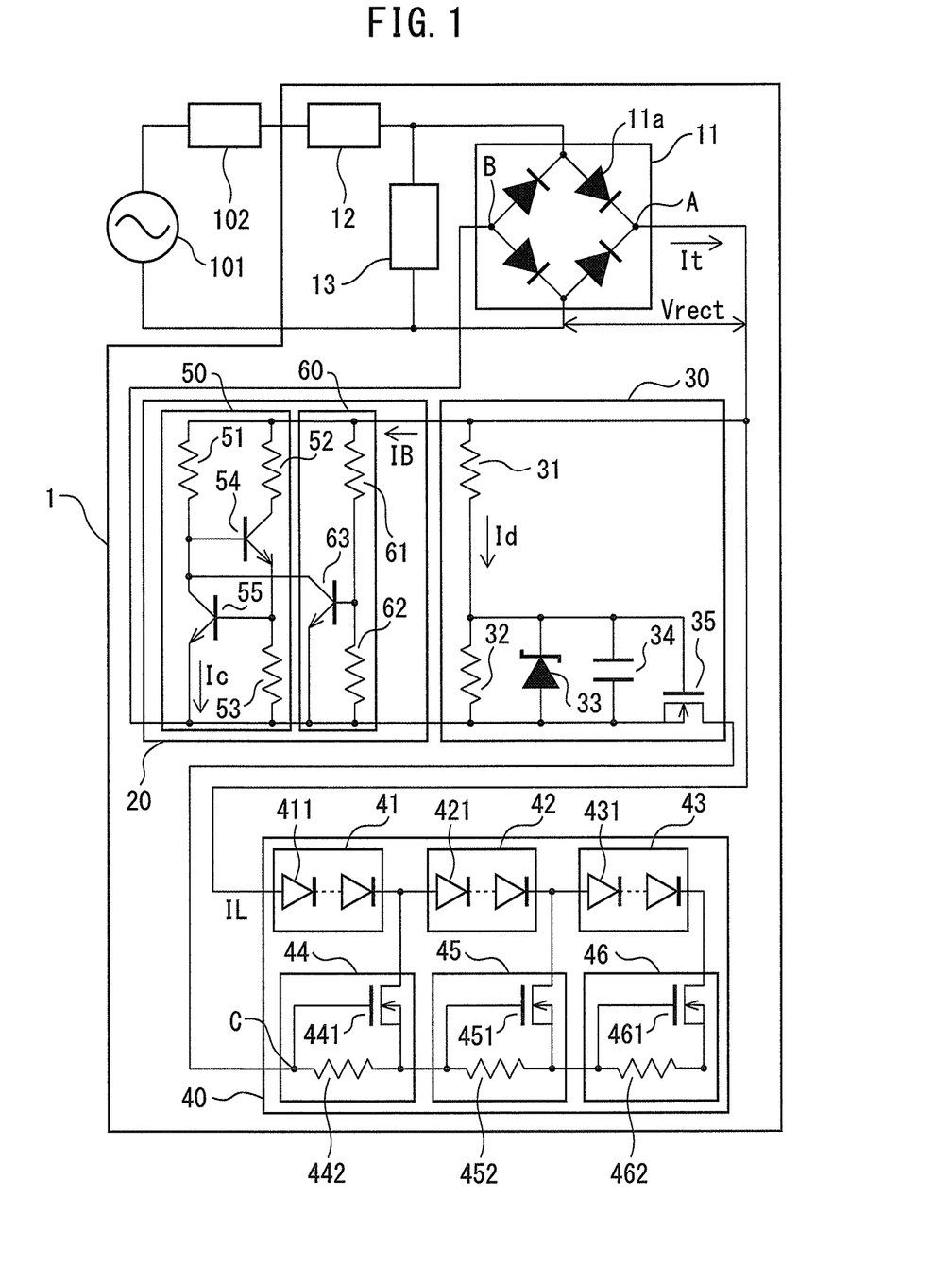
FIG. 1 is a circuit block diagram of an LED drive circuit of an embodiment.

FIG. 1 is a circuit block diagram of an LED drive circuit 1.

The LED drive circuit 1 has a diode bridge rectification circuit 11, a fuse 12, a surge protection circuit 13, a bleeder current circuit 20, a delay circuit 30, and a light emitting unit 40. The LED drive circuit 1 is connected to the commercial alternating-current power source 101 via a dimmer circuit 102. The upper-side terminal of the commercial alternating-current power source 101 is connected to the input terminal of the dimmer circuit 102 and the lower-side terminal of the commercial alternating-current power source 101 is connected with the lower-side input terminal of the diode bridge rectification circuit 11. The output terminal of the dimmer circuit 102 is connected to the upper-side input terminal of the diode bridge rectification circuit 11 via the fuse 12. The dimmer circuit 102 includes a TRIAC® that turns on/off at a desired cycle and cuts part of the waveform of the alternating-current voltage that is input to the LED drive circuit 1 from the commercial alternating-current power source 101 so that the light emitting unit 40 emits light with desired brightness. The fuse 12 is connected between the dimmer circuit 102 and the diode bridge rectification circuit 11 and the surge protection circuit 13 is connected in parallel to the diode bridge rectification circuit 11.

The diode bridge rectification circuit 11 has four diodes 11a and outputs the full-wave rectified waveform voltage Vrect having a full-wave rectified waveform, and a current It from a cathode-side terminal A (hereinafter, also referred to as a current output terminal A) of the four diodes 11a. An anode-side terminal B (hereinafter, also referred to as a ground terminal B) of the four diodes 11a is a terminal to which the current It that is output from the current output terminal A returns, and gives a reference voltage of the LED drive circuit 1.

The bleeder current circuit 20 has a constant current circuit 50 and a voltage detection circuit 60. The constant current circuit 50 has a first bleeder resistor 51, a second bleeder resistor 52, a third bleeder resistor 53, a first bleeder transistor 54, and a second bleeder transistor 55. The voltage detection circuit 60 has a fourth bleeder resistor 61, a fifth bleeder resistor 62, and a third bleeder transistor 63. The first bleeder transistor 54, the second bleeder transistor 55, and the third bleeder transistor 63 are each a bipolar transistor (hereinafter, also referred to simply as a transistor).

The upper-side terminals of the first bleeder resistor 51 and the second bleeder resistor 52 are connected to the current output terminal A of the diode bridge rectification circuit 11 and the lower-side terminal of the third bleeder resistor 53 is connected to the ground terminal B. The collector of the first bleeder transistor 54 is connected to the lower-side terminal of the second bleeder resistor 52 and the base thereof is connected to the lower-side terminal of the first bleeder resistor 51 and to the collector of the second bleeder transistor 55. The emitter of the first bleeder transistor 54 is connected to the upper-side terminal of the third bleeder resistor 53 and to the base of the second bleeder transistor 55. The emitter of the second bleeder transistor 55 is connected to the ground terminal B of the diode bridge rectification circuit 11.

The upper-side terminal of the fourth bleeder resistor 61 is connected to the current output terminal A of the diode bridge rectification circuit 11 and the lower-side terminal of the fifth bleeder resistor 62 is connected to the ground terminal B. The collector of the third bleeder transistor 63 is connected to the base of the first bleeder transistor 54, the base thereof is connected to the lower-side terminal of the fourth bleeder resistor 61 and to the upper-side terminal of the fifth bleeder resistor 62, and the emitter thereof is connected to the ground terminal B.

The constant current circuit 50 included in the bleeder current circuit 20 causes a constant current Ic to flow by maintaining the base-emitter voltage of the second bleeder transistor 55 at 0.6 V and performing a constant current operation when the voltage at the current output terminal A is lower than a predetermined value and the third bleeder transistor 63 turns off. In one example, the constant current Ic when the constant current circuit 50 performs the constant current operation is 10 mA. When the voltage at the current output terminal A becomes equal to or higher than a predetermined bleeder threshold voltage, the third bleeder transistor 63 turns on. When the third bleeder transistor 63 turns on, the second bleeder transistor 55 turns off, and therefore the constant current circuit 50 included in the bleeder current circuit 20 is cut off and the constant current Ic does not flow. The bleeder current circuit 20 operates also during the period of time during which the dimmer circuit 102 cuts part of the alternating-current waveform, since a certain voltage is input. The bleeder current circuit 20 suppresses power consumption by cutting off the constant current Ic that flows through the bleeder current circuit 20 when the voltage of the pulsating current is higher than the predetermined bleeder threshold voltage.

If the LED drive circuit 1 illustrated in FIG. 1 does not have the bleeder current circuit 20, the dimmer circuit 102 may malfunction and output a voltage of about several ten V, when the voltage is reduced by the dimmer circuit 102 to a voltage value at which the light emitting unit 40 does not emit light. If the LED drive circuit 1 illustrated in FIG. 1 does not have the bleeder current circuit 20, the light emitting unit 40 may dimly light up unintentionally due to the malfunction of the dimmer circuit 102. In order to prevent the light emitting unit 40 from lighting up unintentionally, the bleeder current circuit 20 is provided in the LED drive circuit 1 and the operation of the dimmer circuit 102 is stabilized by causing a bleeder current IB to flow when the output voltage of the dimmer circuit 102 is low, and therefore, the light emitting unit 40 is prevented from lighting up unintentionally. Further, the bleeder current circuit 20 does not cause the bleeder current IB to flow when the light emitting unit 40 lights up, and therefore the LED drive circuit 1 may maintain the light emission efficiency highly.

The delay circuit 30 has a first delay resistor 31, a second delay resistor 32, a zener diode 33, a capacitor 34, and an enhancement delay FET 35. The upper-side terminal of the first delay resistor 31 is connected to the current output terminal A of the diode bridge rectification circuit 11 and the lower-side terminal of the first delay resistor 31 is connected to the upper-side terminal of the second delay resistor 32, the cathode of the zener diode 33, the upper-side terminal of the capacitor 34, and the gate of the delay FET 35. The lower-side terminal of the second delay resistor 32, the anode of the zener diode 33, the lower-side terminal of the capacitor 34, and the source of the delay FET 35 are connected to the ground terminal B. The drain of the delay FET 35 is connected to a current output terminal C at which a current is output from the light emitting unit 40.

When the commercial alternating-current power source 101 starts to supply a voltage and the voltage is applied to the LED drive circuit 1 via the dimmer circuit 102, the charge of the capacitor 34 is started by a current Id that flows via the first delay resistor 31. When the capacitor 34 is charged and the gate-source voltage Vgs of the delay FET 35 increases up to a delay threshold voltage Vdth at which the delay FET 35 turns on, the delay FET 35 turns on and the delay FET 35 is brought into conduction between the drain and source. When the delay FET 35 is brought into conduction between the drain and source, a current path of the light emitting current IL is formed, which starts from the current output terminal A of the diode bridge rectification circuit 11 and returns to the ground terminal B of the diode bridge rectification circuit 11 via the light emitting unit 40. The light emitting current IL flows from the current output terminal A and returns to the ground terminal B of the diode bridge rectification circuit 11 via the light emitting unit 40 and the drain and source of the delay FET 35. The upper limit value of a gate-source voltage Vgs of the delay FET 35, which is regulated by the zener diode 33, is a voltage equal to or higher than the delay threshold voltage Vdth and when the gate-source voltage reaches the delay threshold voltage Vdth, the delay FET 35 is brought into conduction between the drain and source.

The delay circuit 30 keeps the current path of the light emitting current IL, which passes through the light emitting unit 40, in the cutoff state from when the commercial alternating-current power source 101 starts to apply the alternating-current voltage to the LED drive circuit 1 via the dimmer circuit 102 until the terminal-to-terminal voltage of the capacitor 34 reaches the delay threshold voltage Vdth and the delay FET 35 turns on. Since the delay circuit 30 keeps the current path of the light emitting current IL, which passes through the light emitting unit 40, in the cutoff state from when the current is supplied to the dimmer circuit 102 until the delay FET 35 turns on, it is unlikely that an unstable voltage when the power source of the dimmer circuit is turned on is applied to the light emitting unit 40. The period of time during which the delay circuit 30 keeps the current path that passes through the light emitting unit 40 in the cutoff state is regulated by a time constant that is regulated by the resistance value of the first delay resistor 31 and the capacitance of the capacitor 34, and the gate-source voltage Vgs at which the delay FET 35 turns on.

Since the delay circuit 30 has the second delay resistor 32 that is connected in parallel to the capacitor 34, the delay circuit 30 may discharge the charges that are charged in the capacitor 34 via the second delay resistor 32 when the connection between the commercial alternating-current power source 101 and the LED drive circuit 1 is cut off.

Since the delay circuit 30 has the zener diode 33 that is connected in parallel to the capacitor 34, the delay circuit 30 may regulate the upper limit value of the gate-source voltage Vgs of the delay FET 135. Since the upper limit value of the gate-source voltage Vgs of the delay FET 135 is regulated by the zener diode 33, the gate is protected from an overvoltage.

The light emitting unit 40 has a first partial LED array 41, a second partial LED array 42, and a third partial LED array 43 that are connected in series, a first bypass circuit 44, a second bypass circuit 45, and a current limiting circuit 46. The first partial LED array 41, the second partial LED array 42, and the third partial LED array 43 form the LED array. The first partial LED array 41 includes a plurality of LEDs 411 connected in series, the second partial LED array 42 includes a plurality of LEDs 421 connected in series, and the third partial LED array 43 includes a plurality of LEDs 431 connected in series. The first bypass circuit 44 has a first depletion bypass FET 441 and a first bypass resistor 442. The drain of the first bypass FET 441 is connected to the connection point between the first partial LED array 41 and the second partial LED array 42, the gate thereof is connected to the left-side terminal of the first bypass resistor 442 and to the drain of the delay FET 35, and the source thereof is connected to the right-side terminal of the first bypass resistor 442. The second bypass circuit 45 has a second depletion bypass FET 451 and a second bypass resistor 452. The drain of the second bypass FET 451 is connected to the connection point between the second partial LED array 42 and the third partial LED array 43 and the gate thereof is connected to the left-side terminal of the second bypass resistor 452 and to the right-side terminal of the first bypass resistor 442. The source of the second bypass FET 451 is connected to the right-side terminal of the second bypass resistor 452. The current limiting circuit 46 has a depletion current limiting FET 461 and a current limiting resistor 462. The drain of the current limiting FET 461 is connected to the cathode of the third partial LED array 43, the gate thereof is connected to the left-side terminal of the current limiting resistor 462 and to the right-side terminal of the second bypass resistor 452, and the source thereof is connected to the right-side terminal of the current limiting resistor 462.

Figure 2A:
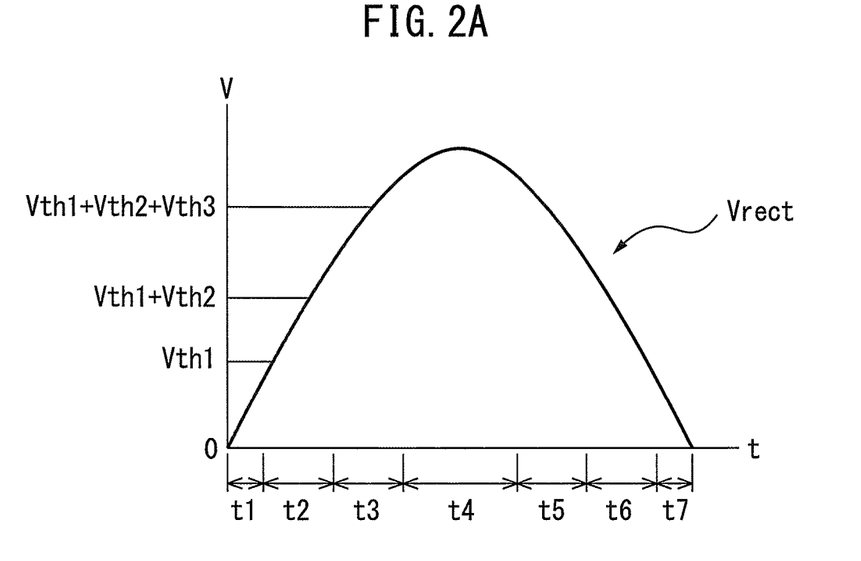
FIG. 2A is a diagram illustrating a full-wave rectified waveform voltage explaining the operation of the LED drive circuit illustrated in FIG. 1.
Figure 2B:
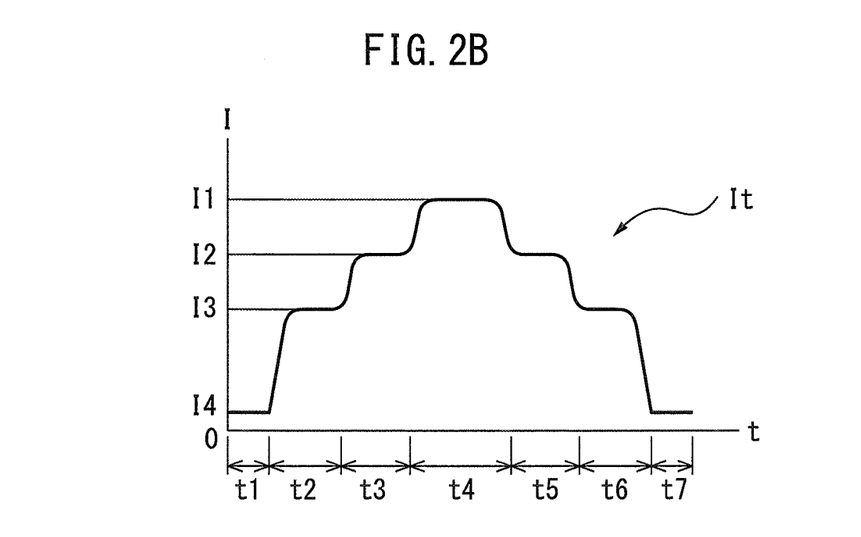
FIG. 2B is a diagram illustrating a waveform current corresponding to FIG. 2A explaining the operation of the LED drive circuit illustrated in FIG. 1.

FIGS. 2A and 2B are diagrams illustrating the operation of the LED drive circuit 1 in the stationary state, and FIG. 2A is a diagram illustrating the full-wave rectified waveform voltage Vrect and FIG. 2B is a diagram illustrating the output current It that is output from the current output terminal A. The horizontal axis in FIG. 2A represents the time t, the vertical axis represents the voltage V, and the curve in FIG. 2A represents the full-wave rectified waveform voltage Vrect at the current output terminal A. The horizontal axis in FIG. 2B represents the time t, the vertical axis represents the current I, and the curve in FIG. 2B represents the current It that is output from the current output terminal A. Each of t1 to t7 illustrated along the time axis in FIG. 2A corresponds to each of t1 to t7 illustrated along the time axis in FIG. 2B. The stationary state is a state where a sufficient time has elapsed after the alternating-current voltage is applied, the delay FET 35 is brought into conduction between the drain and source, and the dimmer circuit 102 operates stably. In the operation illustrated in FIG. 2A and FIG. 2B, the dimmer circuit 102 outputs a complete alternating-current waveform without any cut part. Further, although when the full-wave rectified waveform voltage Vrect is very close to 0 V, the bleeder current IB is zero, the period of time during which the full-wave rectified waveform voltage Vrect is very close to 0 V is short, and therefore not illustrated explicitly in FIG. 2B. During the periods of time t2 to t6, the constant current circuit 50 included in the bleeder current circuit 20 is cut off, and therefore the constant current Ic does not flow. Further, during the periods of time t2 to t6, the current that flows through the fourth bleeder resistor 61 and the first delay resistor 31 is small compared to the output current It, and therefore the current is not illustrated explicitly in FIG. 2B.

During the period of time t1, since the full-wave rectified waveform voltage Vrect is lower than the threshold voltage Vth1 of the first partial LED array 41, no current flows through the first partial LED array 41, the second partial LED array 42, and the third partial LED array 43, and therefore the light emitting current IL is zero. The threshold voltage Vth1 of the first partial LED array 41 is the total sum of the forward voltage drops of the LEDs 411 connected in series in the first partial LED array 41. For example, when the number of serial stages of the LED 411 is 30 and the forward voltage drop of the LED 411 is 3 V, the threshold voltage of the first partial LED array 41 is 90 V.

During the period of time t1, the bleeder current IB flows through the bleeder current circuit 20. During the period of time t1, the light emitting current IL does not flow, and the bleeder current IB flows, and therefore a current I4, which is the output current It from the current output terminal during the period of time t1, is equal to the bleeder current IB.

During the period of time t2, the full-wave rectified waveform voltage Vrect becomes equal to or higher than the threshold voltage Vth1 of the first partial LED array 41, and therefore the light emitting current IL flows through the first partial LED array 41. However, during the period of time t2, the full-wave rectified waveform voltage Vrect is lower than the total value of the threshold voltage Vth1 of the first partial LED array 41 and the threshold voltage Vth2 of the second partial LED array 42, and therefore the light emitting current IL does not flow through the second partial LED array 42. The light emitting current IL does not flow through the second partial LED array 42, but flows to the ground terminal B of the diode bridge rectification circuit 11 via the first bypass circuit 44. When the light emitting current IL flows through the first bypass circuit 44, the gate-source voltage Vgs of the first bypass FET 441 is regulated by the voltage drop due to the first bypass resistor 442 and the first bypass FET 441 performs the constant current operation. A current I3, which is the output current It that is output from the current output terminal A and flows through the first bypass resistor 442 during the period of time t2, is equal to the light emitting current IL that flows via the first partial LED array 41. At the last part of the period of time t2, the full-wave rectified waveform voltage Vrect becomes slightly higher than the total value of the threshold voltage Vth1 of the first partial LED array 41 and the threshold voltage Vth2 of the second partial LED array 42, and therefore a current begins to flow through the second partial LED array 42. When the current that flows through the second partial LED array 42 is small, the total value of the current that flows through the first bypass FET 441 and the current that flows through the second partial LED array 42 becomes the current I3 and is almost constant.

During the period of time t3, when the current that flows through the second partial LED array 42 increases and becomes equal to or larger than the first bypass threshold value, Vgs of the first bypass FET 441 becomes lower than the cutoff voltage in accordance with the voltage drop due to the first bypass resistor 442, and therefore the first bypass FET 441 is cut off. The voltage drop due to the second bypass resistor 452 makes constant the gate-source voltage Vgs of the second bypass FET 451, and therefore the second bypass FET 451 performs the constant current operation. Since the first bypass FET 441 is cut off, a current I2 that flows through the second bypass resistor 452 is equal to the light emitting current IL that flows via the first partial LED array 41 and the second partial LED array 42. At the last part of the period of time t3, the total value of the current that flows through the FET 451 and the current that flows through the third partial LED array 43 becomes the current I2 and is almost constant.

During the period of time t4, when the current that flows through the third partial LED array 43 increases and becomes equal to or larger than the second bypass threshold value, the gate-source voltage Vgs of the second bypass FET 451 becomes lower than the cutoff voltage in accordance with the voltage drop due to the second bypass resistor 452, and therefore the second bypass FET 451 is cut off. The voltage drop due to the current limiting resistor 462 makes constant the gate-source voltage Vgs of the current limiting FET 461, and therefore the current limiting FET 461 performs the constant current operation. Since the first bypass FET 441 and the second bypass FET 451 are cut off, a current I1 that flows through the current limiting resistor 462 is equal to the light emitting current IL that flows via the first partial LED array 41, the second partial LED array 42, and the third partial LED array 43. During the period of time t4, the constant current circuit 50 included in the bleeder current circuit 20, the first bypass FET 441, and the second bypass FET 451 are cut off. During the second half of the period of time T4 and during the periods of time t5, t6, and t7, which are in the phase in which the full-wave rectified waveform voltage Vrect is reduced, the change in the current It is opposite.

When the LED drive circuit is in the stationary state and the dimmer circuit 102 outputs the complete full-wave rectified waveform voltage Vrect, the current It changes in four stages from the current I1 to the current I4.

Figure 3A:
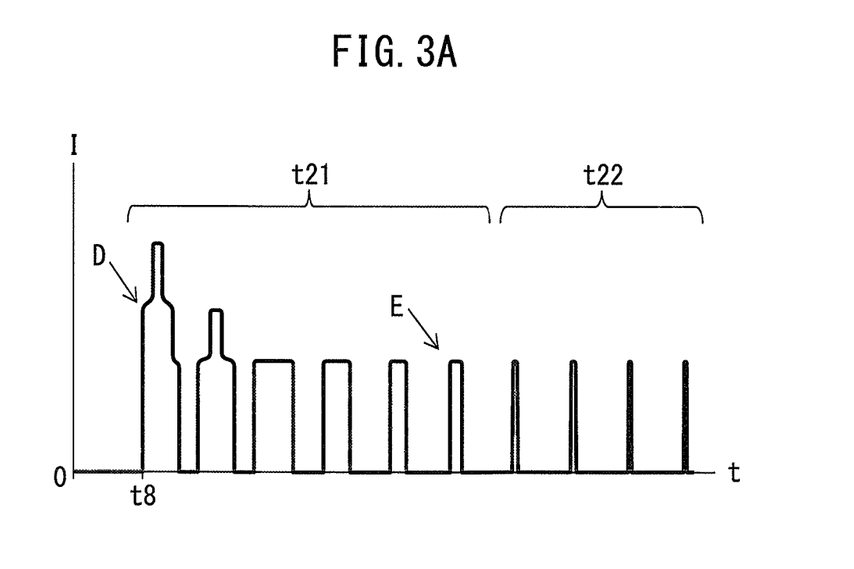
FIG. 3A is a diagram illustrating a waveform current explaining the operation of a comparative example LED drive circuit.
Figure 3B:
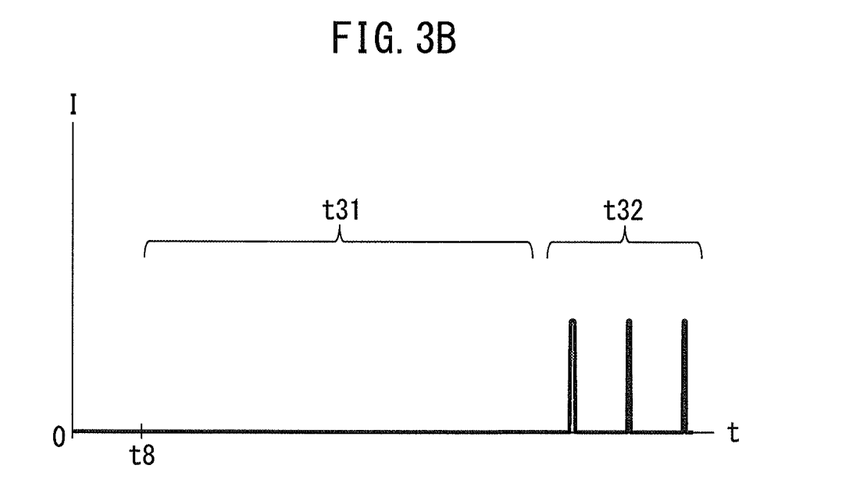
FIG. 3B is a diagram illustrating a waveform current explaining the operation of the LED drive circuit illustrated in FIG. 1.

FIGS. 3A and 3B are diagrams explaining the operation in the transient state immediately after the application of a voltage to the LED drive circuit 1 from the commercial alternating-current power source 101 via the dimmer circuit 102 is started. FIG. 3A is a diagram illustrating the light emitting current IL that flows through the light emitting unit 40 in a comparative example in which the delay circuit 30 is removed from the LED drive circuit 1. FIG. 3B is a diagram illustrating the light emitting current IL that flows through the light emitting unit 40 of the LED drive circuit 1 according to the embodiment. In FIGS. 3A and 3B, at time t8, the application of a voltage to the dimmer circuit 102 from the commercial alternating-current power source 101 is started and the period of time encompassing 10 cycles of the full-wave rectified waveform voltage Vrect is illustrated. The time axis in FIG. 3A corresponds to the time axis in FIG. 3B. In FIGS. 3A and 3B, the dimmer circuit 102 cuts part of the waveform of the alternating-current voltage that is output from the commercial alternating-current power source 101 so that the full-wave rectified waveform voltage Vrect is left during the periods of time t6 and t7 in FIGS. 2A and 2B. In other words, in the examples illustrated in FIGS. 3A and 3B, the dimmer circuit 102 cuts the waveform of the alternating-current voltage that is output from the commercial alternating-current power source 101 across the periods of time t1 to t5 in FIGS. 2A and 2B.

The operation in the comparative example illustrated in FIG. 3A is explained. At the time t8, although the application of the alternating-current voltage to the dimmer circuit 102 from the commercial alternating-current power source 101 is started, during a period of time t21 during which the state is a transient state, the operation of the dimmer circuit 102 is not stable. A voltage waveform in a period indicated by arrow D in FIG. 3A is output from the dimmer circuit 102 in the full-wave rectified waveform, which is cut a bit. The current waveform indicated by arrow D is the same as the waveform illustrated in FIG. 2B except in that part of the left end is cut out. In the comparative example illustrated in FIG. 3A, as the time t elapses, the peak voltage is reduced and at the same time, the pulse width becomes narrower in the output waveform of the dimmer circuit 102, and the transient state of the dimmer circuit 102 ends in the sixth cycle indicated by arrow E. In the seventh cycle indicated during a period of time t22, the output waveform of the dimmer circuit 102 becomes a waveform in the stationary state. In the comparative example illustrated in FIG. 3A, in the transient state indicated during the period of time t21 from the time t8, the light emitting unit 40 lights up brightly and flashes, and in the stationary state indicated during the period of time t22, the light emitting unit 40 enters a desired dimmed state.

With reference to FIG. 3B, the operation of the LED drive circuit 1 is explained. In the LED drive circuit 1, during the period of time from when the application of the alternating-current voltage to the dimmer circuit 102 from the commercial alternating-current power source 101 is started at the time t8 until the terminal-to-terminal voltage of the capacitor 34 reaches the delay threshold value Vdth, the delay FET 35 remains off. In the LED drive circuit 1, during the period of time from when the application of the alternating-current voltage to the dimmer circuit 102 is started until the terminal-to-terminal voltage of the capacitor 34 reaches the delay threshold value Vdth, the current path of the light emitting current IL via the light emitting unit 40 is kept cut off. Since the current path of the light emitting current IL via the light emitting unit 40 is kept cut off during the period of time from when the application of the alternating-current voltage to the dimmer circuit 102 is started until the terminal-to-terminal voltage reaches the delay threshold value Vdth, the light emitting current IL does not flow through the light emitting unit 40, and therefore it is unlikely that the light emitting unit 40 emits light. In FIG. 3B, the period of time from when the application of the alternating-current voltage to the dimmer circuit 102 is started until the terminal-to-terminal voltage of the capacitor 34 reaches the delay threshold value Vdth is a period of time corresponding to the seven cycles of the full-wave rectified waveform voltage Vrect indicated by a period of time t31. In the eighth and subsequent cycles from the time t8 of the full-wave rectified waveform, which are indicated by a period of time t32, the delay FET 35 is on and the light emitting current IL flows through the light emitting unit 40, and therefore the light emitting unit 40 emits light. During the period of time t32, the state is a stationary state and the light emitting current IL has the normal waveform, and therefore the light emitting unit 40 emits light in a desired dimmed state.

Since the LED drive circuit 1 has the delay circuit 30, the light emitting unit 40 does not emit light in the transient state where the dimmer circuit 102 immediately after the application of the alternating-current voltage to the dimmer circuit 102 is started is in an unstable state. In the LED drive circuit 1, the light emitting unit 40 does not emit light in the transient state, and therefore the occurrence of flashing is prevented, in which the light emitting unit 40 lights up brightly immediately after the application of the alternating-current voltage to the dimmer circuit 102 is started. In one example, the delay time from when the application of the alternating-current voltage to the dimmer circuit 102 is started until the capacitor 34 is charged in the LED drive circuit 1 is equal to or less than 100 ms. However, when the LED drive circuit 1 is used in a lighting apparatus, the delay time may be set to a length so sufficiently long that the dimmer circuit 102 naturally stabilizes, and may be set to about 200 ms to 300 ms.

The drive system in which a pulsating current in the full-wave rectified waveform or the like, which is obtained by rectifying the voltage waveform obtained from the commercial alternating-current power source, is applied to the LED array in which a plurality of LEDs is connected in series is also referred to as AC drive. The LED drive circuit 1 is an aspect of the AC drive. The LED drive circuit according to the embodiment cuts off the current that is caused to flow through the LED array when the operation of the dimmer circuit is unstable, and therefore the LED drive circuit may be applied to all LED drive circuits based on the AC drive.

The LED drive circuit 1 causes a delay to occur by using an increase in the voltage across both ends of the capacitor 41. However, the means for causing a delay to occur is not limited to this method. For example, a delay may be occurred by digital control. If a delay is occurred by digital control, when the alternating-current voltage is applied, the counter is started and after a predetermined time elapses, the switch is turned on. The LED drive circuit 1 is based on a pulsating current that is formed by a dimmer, and therefore the LED drive circuit 1 has the characteristics that the delay time varies in accordance with the degree of dimming, whereas the amount of delay by a delay caused to occur by digital control may be constant.

If the control unit of the delay circuit is digitized, any voltage may be applied to the control terminal of the switch by using a D/A converter. For example, the dimmed state may be gradually changed from a dark state to a desired dimmed state by controlling the on-resistance of the switch and gradually switching from off to on.

In the LED drive circuit 1, the switch 35 is an N-type enhancement FET. However, the switch is not limited to this element. For example, the switch may be a bipolar transistor, a transmission gate, or a thyristor. Further, the drain of the switch 35 is connected to the terminal from which the current of the light emitting unit 40 is output and the source thereof is connected to the ground terminal B of the rectification circuit 11. In contrast to this, if a P-type enhancement FET is used as the switch, the drain of the P-type enhancement FET may be connected to the terminal to which the current of the light emitting unit 40 is input and the source thereof may be connected to the current output terminal A of the rectification circuit 11. At present, the characteristics of the N-type enhancement FET are better than those of the P-type enhancement FET.

REFERENCE SINGS LIST

1 LED drive circuit;
11 diode bridge rectification circuit;
20 bleeder current circuit;
30 delay circuit;
31 first delay resistor;
32 second delay resistor;
33 zener diode;
34 capacitor;
35 delay FET;
40 light emitting unit
41, 42, 43 partial LED array;
44, 45 bypass circuit;
46 current limiting circuit;
101 commercial alternating-current power source; and
102 dimmer circuit;

What is claimed is:

1. An LED drive circuit comprising:
    a rectification circuit configured to rectify an alternating-current voltage that is input via a dimmer circuit;
    a delay circuit having a switch; and
    a light emitting unit including an LED array including LEDs connected in series, wherein
    the delay circuit turns on the switch when a predetermined time elapses after the alternating-current current is input,
    the rectification circuit and the LED array are directly connected when the switch is on,
    the rectification circuit outputs a pulsating current after rectifying the alternating-current voltage that is input via the dimmer circuit,
    the delay circuit is supplied the pulsating current from the rectification circuit, and further has a capacitor and a capacitor charge circuit configured to supply the Pulsating current to the capacitor,
    the LED array inputs the pulsating current when the switch is on, and
    the switch turns on when a terminal-to-terminal voltage of the capacitor becomes equal to or higher than a predetermined voltage and forms a current path through which a current that is output from the rectification circuit returns to the rectification circuit after passing through the LED array.

2. The LED drive circuit according to claim 1, wherein the capacitor charge circuit includes a first resistor that is connected in series to the capacitor.

3. The LED drive circuit according to claim 2, wherein the delay circuit further includes a second resistor that is connected in parallel to the capacitor.

4. The LED drive circuit according to claim 3, wherein the delay circuit further includes a zener diode that is connected in parallel to the capacitor.

5. The LED drive circuit according to claim 1, wherein the switch is an N-type enhancement FET, the gate of which is connected to a high potential side terminal of the capacitor, the source of which is connected to a terminal to which a current of the rectification circuit returns, and the drain of which is connected to a terminal from which a current of the LED array is output.

6. The LED drive circuit according to claim 1, further comprising a bleeder current circuit that is connected in parallel to the LED array and which forms a current path through which a current that is output from the rectification circuit flows when a voltage between the anode and cathode of the LED array is lower than a bleeder threshold voltage.

7. The LED drive circuit according to claim 6, wherein the bleeder current circuit cuts off the current path when the voltage between the anode and cathode of the LED array is equal to or higher than the bleeder threshold voltage.

8. The LED drive circuit comprising:
    a rectification circuit configured to rectify an alternating-current voltage that is input via a dimmer circuit;
    a delay circuit having a switch;
    a light emitting unit including an LED array including LEDs connected in series, and
    a bleeder current circuit that is connected in parallel to the LED array and which forms a current path through which a current that is output from the rectification circuit flows when a voltage between the anode and cathode of the LED array is lower than a bleeder threshold voltage, wherein
    the delay circuit turns on the switch when a predetermined time elapses after the alternating-current current is input,
    the rectification circuit and the LED array are directly connected when the switch is on, and
    the LED array includes a plurality of partial LED arrays connected in series and a bypass circuit that is connected to a connection point between the plurality of partial LED arrays.

9. The LED drive circuit according to claim 8, wherein the bypass circuit is cut off when a current that flows through the partial LED array on the subsequent stage side connected to the connection point becomes equal to or larger than a bypass threshold value.

* * * * *